Figure 1:
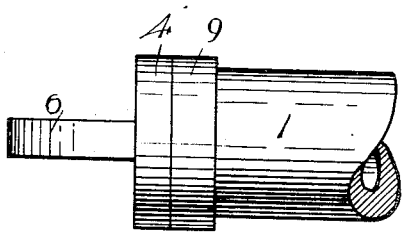

W. R. JEAVONS.
PIPE END CLOSURE.
APPLICATION FILED NOV. 16, 1908.

968,853.

Patented Aug. 30, 1910.

Witnesses
Oliver M. Kappler
Brennan B. West

Inventor
Wm. R. Jeavons
By Bates, Fouts & Hull
Attys

UNITED STATES PATENT OFFICE.

WILLIAM R. JEAVONS, OF CLEVELAND, OHIO.

PIPE-END CLOSURE.

968,853.

Specification of Letters Patent. Patented Aug. 30, 1910.

Application filed November 16, 1908. Serial No. 462,775.

*To all whom it may concern:*

Be it known that I, WILLIAM R. JEAVONS, a citizen of the United States, residing at Cleveland, in the county of Cuyahoga and State of Ohio, have invented a certain new and useful Improvement in Pipe-End Closures, of which the following is a full, clear, and exact description, reference being had to the accompanying drawings.

This invention relates to joints or connections and more particularly to connections for a supply pipe whereby an efficient end closure for such pipe may be secured.

The object of the invention is to secure a tight joint between such end closure and the supply pipe, which joint will dispense with the necessity for the employment of solder and will at the same time prevent any leakage at the joint.

Generally speaking, the invention may be defined as consisting of the combinations of elements embodied in the claims hereto annexed and illustrated in the drawings forming a part hereof, wherein—

Figure 2:
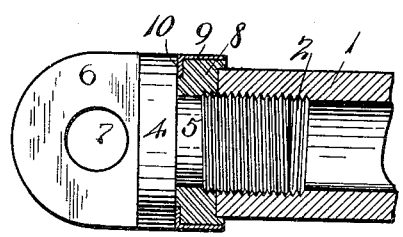
Figure 3:
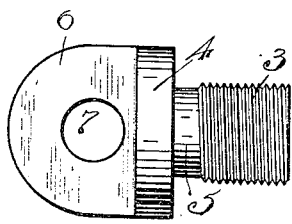
Figure 4:
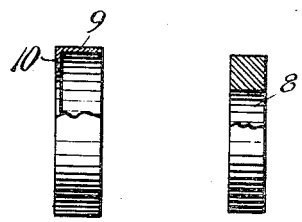
Figure 5:
Figure 6:
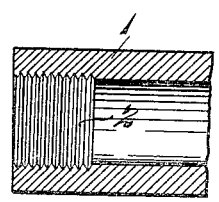

Figure 1 represents a view in elevation of a pipe end having my closure applied thereto; Fig. 2 represents a detail, partly in section and partly in elevation, of the parts shown in Fig. 1; Fig. 3 a side elevation of the plug forming part of the closure; Fig. 4 a detail, partly in elevation and partly in section, of the sleeve which forms part of the closure; Fig. 5 a view similar to Fig. 4 of the washer forming part of such closure; and Fig. 6 a sectional detail of the end of the supply pipe, the parts in Figs. 3 to 6 inclusive being arranged in the order in which they are assembled, separated for the purpose of clearness of illustration.

Describing the parts by reference numerals, 1 denotes the supply pipe having its end provided with an interior thread 2. This end is adapted to receive the externally threaded end 3 of a plug, said plug comprising a base 4, from which the plug proper projects. Between the threaded end of the plug and the base 4, the body of the plug is reduced, as shown at 5 and is unthreaded. The outer end of the plug is flattened, as shown at 6, for convenience of manipulation and is provided with apertures 7 for the reception of a rod or other operating means for screwing the plug into and out of the pipe 1.

8 denotes a washer, which is of such internal diameter as to be adjustable along the plug, and 9 a sleeve having an inwardly projecting flange 10 which is of greater internal diameter than the external diameter of the plug body 3. This sleeve is of greater length than the normal depth of the washer and is of slightly greater diameter than the adjacent end of the supply pipe 1.

In using the end closure shown herein, the sleeve 9 and washer 8 are applied to the plug, the washer fitting within the sleeve and the flanged end of the sleeve abutting against the body 4. The end 3 of the plug is threaded into the supply pipe and is set up firmly thereagainst. This compresses the washer, which is preferably of lead, squeezing some of the material thereof through the annular space between the flange 10 and the unthreaded portion 5 of the plug against the body or seat 4 which supports the flange and also squeezing some of the washer material into the space between the outer end of the sleeve 9 and the supply pipe.

The construction described provides simple but very effective means for forming a tight but detachable closure for the end of the supply pipe and prevents the plug from jarring loose, particularly in cases where the pipe forms part of an apparatus that is shipped to a distant point.

Having thus described my invention, what I claim is:

1. The combination, with a pipe end, of a closure for such end, said closure comprising a plug having a projection adapted to enter the pipe end and an outwardly projecting base, a washer of compressible material surrounding the projection, a sleeve surrounding said washer and having at the end adjacent said base an inturned flange the internal diameter of which is greater than the external diameter of said projection, and means whereby said plug may be adjusted toward the pipe end to compress the said washer between the base and the pipe end.

2. The combination, with a supply pipe having an internally threaded end, of a closure for the same, said closure comprising a plug having a base and an externally threaded projection adapted to fit the internal thread of the pipe, a washer of compressible material surrounding a portion of the projection, a sleeve of greater diameter than the end of said pipe surrounding said washer and having an inturned flange of greater internal diameter than the external diameter of said projection.

3. The combination, with a supply pipe having an internally threaded end, of a closure for the same, said closure comprising a plug having a base and a projection, said projection being threaded to fit the pipe and having a reduced unthreaded portion adjacent to said base, a washer of compressible material surrounding said projection, and a sleeve of greater internal diameter than the external diameter of said pipe surrounding said washer and having an inwardly directed flange adjacent to said base, the internal diameter of said flange being greater than the diameter of the adjacent portion of the projection.

In testimony whereof, I hereunto affix my signature in the presence of two witnesses.

WILLIAM R. JEAVONS.

Witnesses:
J. B. HULL,
BRENNAN BEDEST.